United States Patent
Osaki et al.

[11] Patent Number: 6,149,519
[45] Date of Patent: Nov. 21, 2000

[54] ELECTRONIC GAME DEVICE

[75] Inventors: Makoto Osaki; Takashi Fujimura; Naotake Nishimura; Koki Koiwa; Ringo Manabe; Yukio Tsuji, all of Tokyo, Japan

[73] Assignee: Kabushiki Kaisha Sega Enterprises, Tokyo, Japan

[21] Appl. No.: 09/312,602

[22] Filed: May 17, 1999

[30] Foreign Application Priority Data

May 18, 1998 [JP] Japan ................................. 10-135636

[51] Int. Cl.$^7$ ........................................................ A63F 9/22
[52] U.S. Cl. ................................................. 463/1; 463/30
[58] Field of Search ........................... 463/6, 7, 29, 23, 463/24; 273/459–461, DIG. 26; 700/91, 92; 340/323 R; 235/78 G, 88 G, 1 R, 1 B; 116/200, 222

[56] References Cited

U.S. PATENT DOCUMENTS

| | | | |
|---|---|---|---|
| 4,752,068 | 6/1988 | Endo | 273/1 |
| 4,858,930 | 8/1989 | Sato | 273/85 |
| 5,014,982 | 5/1991 | Okada et al. | 273/435 |
| 5,083,271 | 1/1992 | Thacher et al. | 364/411 |
| 5,395,242 | 3/1995 | Slye et al. | 434/43 |

OTHER PUBLICATIONS

Propinball: Timeshock, Dec. 1997.
Propinball: The Web, Sep. 1996.

*Primary Examiner*—Mark A. Sager
*Attorney, Agent, or Firm*—Finnegan, Henderson, Farabow, Garrett & Dunner, L.L.P.

[57] ABSTRACT

An electronic game device comprises a game implementing module (30) for implementing a game; a storing module (36) for storing game results for each player; a calculating module (34) for (i) reading out a game result of the player stored in the storing module, (ii) adding the game result achieved in the game to the game result read out from the storing module, and (iii) newly storing this sum value in the storing module; and a display module for displaying the newly stored game result (13). The game device may also comprise a characteristics value storing module for storing characteristics values relating to the output device for each of the identification symbols; a reading module for reading out characteristics values corresponding to an identification symbol input by a player from the characteristics value storing module; and setting module for setting the characteristics of the output device on the basis of the characteristics values thus read out.

10 Claims, 11 Drawing Sheets

TOURNAMENT PERIOD   MAY 1ST - JUNE 21ST  ← 500

MAY 1ST   000-XX: 1000: RACE CAR NAME
  ↑502      ↑504    ↑506

MAY 2ND   000-XX: 1100: RACE CAR NAME

⭡ 600
　　　　　　1ST　　000-XX:　1500:　RACE CAR NAME

2ND　　000-XX:　1400:　RACE CAR NAME

Please enter your birthday (month, date),
This will be used as a part of your password.

V.C-1 ☐ Decrease month
V.C-2 ☐ Increase month
V.C-3 ☐ Decrease date
V.C-4 ☐ Increase date Use V.C-button to enter your birthday.

03 Month/ 27 Date

Confirm month/date, then gas to accept

Notice : If the same password (combination of name & birthday) exists, your score will be added to the first resistered player.

[Fig.10]

OUTLET NAME

RANKING

EXPERT

| | | | | |
|---|---|---|---|---|
| 1ST | E | AT | RCT | 5'00"00 |
| 2ND | E | AT | NAG | 5'05"00 |
| 3RD | E | AT | OSA | 5'10"00 |
| 4TH | E | AT | NKS | 5'15"00 |
| 5th | E | AT | FGM | 5'20"00 |
| COURSE RECORD | E | AT | TMI | 2'30"00 |

4 CREDITS TO START

[Fig.11]

OUTLET NAME 98.05.04 ~ 98.05.19

| PANK | NAME | POINT | No. OF PLAY |
|------|------|-------|-------------|
| 1 | OSA | 1050 | 44 |
| 2 | FJM | 614 | 21 |
| 3 | NGS | 269 | 7 |
| 4 | NIS | 246 | 8 |
| 5 | KOI | 162 | 11 |
| 6 | ANA | 142 | 4 |

PUSH START BUTTON

FREE PLAY

ELECTRONIC GAME DEVICE

BACKGROUND OF THE INVENTION

1. Field of the Invention

The present invention relates to an electronic game device, and particularly, to a video game device for implementing a racing game. More particularly, it relates to improvements in a system for recording game results and displaying same on a screen. The electronic game device according to the present invention provides an arcade game device or domestic game device.

2. Description of the Related Art

With progress in computer technology, video game devices using computer graphics technology have become widely used. One example of the video game devices of this type are race game devices based on a car racing contest.

Race game devices of this type comprise a frame similar to the driving seat of a car (driver's seat) and a display device, such as a liquid-crystal projector, CRT, or the like, positioned in front of this frame. A player sits in the driver's seat, and when he or she controls a steering wheel, accelerator, brakes, and the like, in accordance with the video image displayed on the screen of the display device, car movements based on the results of these control actions are created by a microcomputer. Thereupon, a screen corresponding to these car movements is provided on the display device. tournament data storage region of the RAM. For instance, for the sake of convenience, the lowest possible score is stored as an initial value in each address of the tournament data memory, of which there are "52". The CPU updates the highest score within the unit time period in the corresponding address of the RAM, each time the game is played.

Next, the operation of this game device is described in detail. Firstly, the person managing the game device sets the operational mode of the game device to the aforementioned tournament mode. In this case, each memory address for the game results in the tournament mode is initialized and the aforementioned lowest score is set therein.

Figure 4:
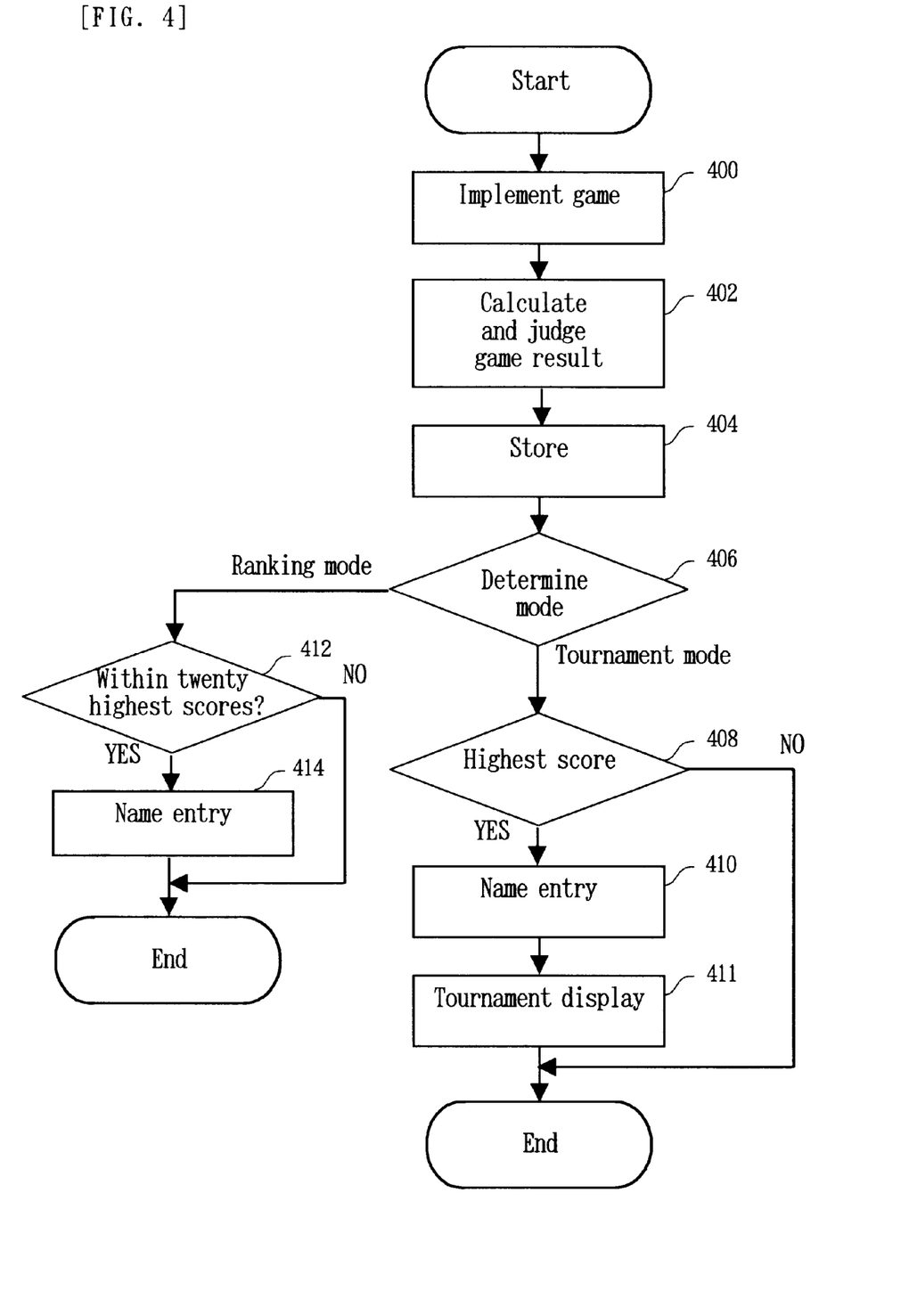
FIG. 4 is an operational flowchart for same.

The subsequent operation of the game device is described using the flowchart in FIG. 4. when the player plays a game, the corresponding game result is calculated, and the game result, ranking, and the like, is stored in a prescribed region of a prescribed RAM (400–404). Thereupon, it is determined whether or not the device is in the tournament mode or the ranking mode (406).

Figure 3:
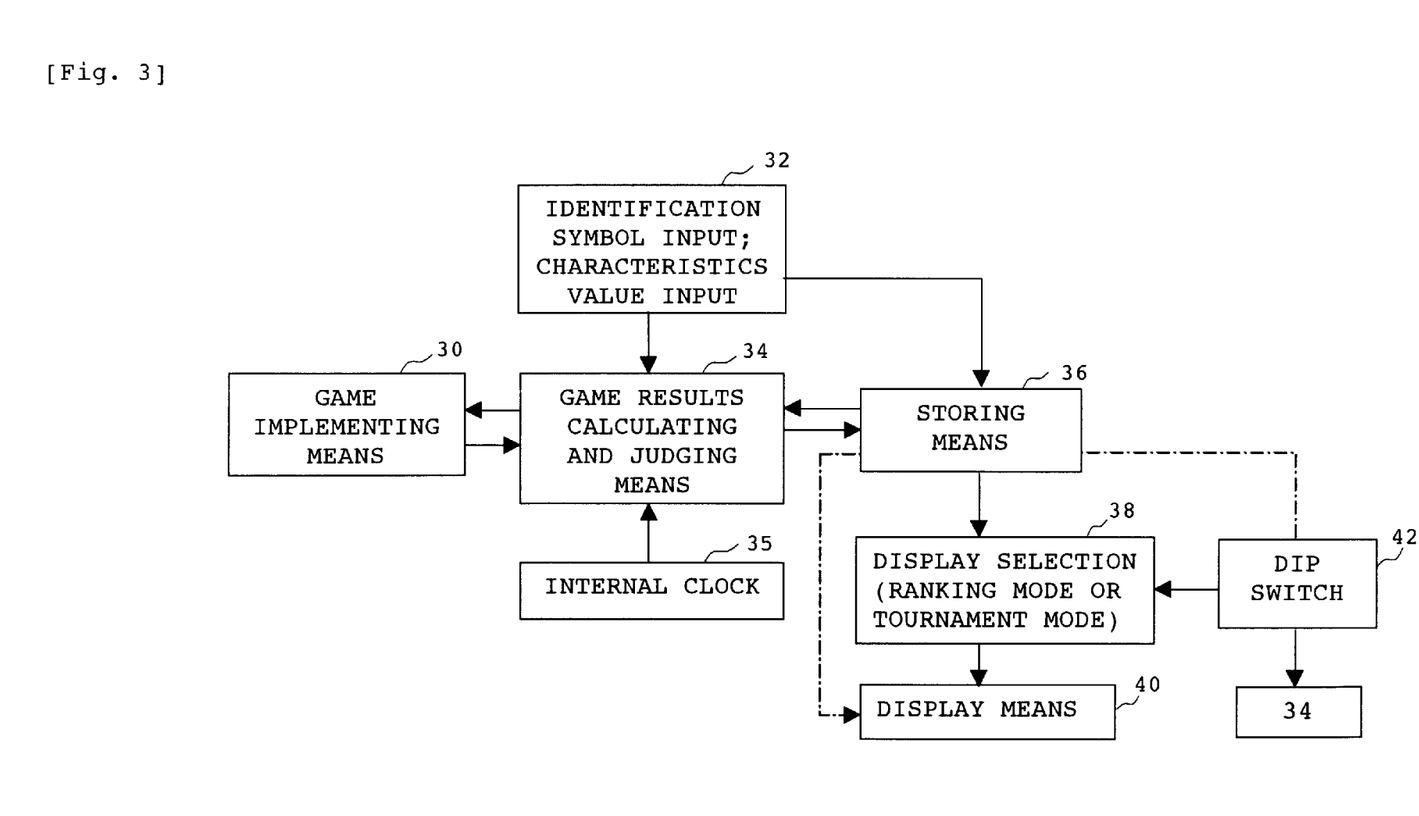
FIG. 3 is a functional block diagram of an electronic game device relating to the present invention.

Since the game device is set to the tournament mode, the game result calculating and judging means 34 illustrated in FIG. 3 determines whether or not the game result stored at step 404 is the highest score within the unit time period (408). The unit time period is specified by the aforementioned dip switch 42 to means 34. Means 34 determines the unit time period from the switch 42 and the internal clock 35 data, and stores this in storage means 36.

In the case of the highest score, the device transfers

In a driving game device of this type, data relating to the game results of some players achieving the highest scores in the driving game are recorded in a memory devices, and the recorded data is divided up, player by player, and displayed on a monitor. when the game has been finished, a player achieving a high score is able to input symbols indicating his or her identity to the driving game device. These symbols, in other words, identification symbols for specifying the game player, are called a "name", and are usually constituted by several letters of the alphabet.

Unless the data in the memory is cleared, a combination or a prescribed number of names and game result data corresponding to these names is recorded in the game device. If a player newly plays the race game, and achieves a high score, then the corresponding game result is stored in the memory in place of the data for the person having the lowest position therein. The monitor displays game scores for each name, in order starting from the person having the greatest result.

In the aforementioned race game device, the following problems arise. Firstly, since game results are merely displayed name by name, the form of this display is monotonous. Moreover, it is not easy to compile results in a cumulative fashion for the same person, for example, even if the same name is used, a game result will be stored separately if the date and time of game play is different. Furthermore, it is difficult to conduct processing whereby, for example, a certain time period is specified and the highest score in that time period is identified, or the like.

Moreover, in a conventional driving game device, the operational characteristics of the frame containing the driver's seat, in other words, the characteristics of virtual suspension, or engine characteristics, or the like, can be set according to the player's intention, but these settings have had to be made each time the player plays the game.

Therefore, it is an object of this invention to provide an electronic game having an improved form of display of game results which is not monotonous It is a further object of the present invention to provide an electronic game device having an excellent cumulating function for game results. It is yet a further object of the present invention to provide an electronic game device whereby characteristics of the game device matched to each individual player do not have to be set each time the game is played.

In order to achieve the aforementioned objects, the present invention is an electronic game device comprising: clock function means for realizing a clock function; time period specifying means for specifying a time period by means of the clock function means; game result storing means for storing game results achieved in this time period; identifying means for identifying a game player; and means for displaying game results for the identified game player on a screen.

Therefore, according to this invention, since game results in a specified time period can be displayed for each game player, compilation of game results becomes easy and the display of game results does not become monotonous.

In a further aspect of the present invention, the game results storing means is a memory storing the greatest game results in the specified time period. In a further aspect of the present invention, the game results storing means is a memory storing cumulative game results in the specified time period. In yet a further aspect of the present invention, the identifying means comprises means for inputting an identification symbol selected by the game player. In yet a further aspect of the present invention, the identification symbol contains a password.

In a further aspect of the present invention, the identifying means is means for inputting data relating to the birthday of the game player as the identification symbol. A further aspect of the present invention also comprises storing means for storing the identification symbols, judging means for judging agreement with an input identification symbol, and means for (i) reading our a game result stored in said storing means, (ii) adding the game result read out from the storing means, and (iii) and storing this sum value in said storing means when this judgement step produces a positive result.

Moreover, the present invention is also an electronic game device comprising; game implementing means for implementing a game; game results storing means for storing game results for a player for each identification symbol selected by a player; calculating means for (i) reading out a game result stored in the storing means with respect to an identification symbol input by a player, (ii) adding the game result achieved in the game to the game result read our from the storing means, and (iii) newly storing this sum value in the game results storing means; and means for displaying the newly stored game result.

Consequently, since the cumulative game result for each player can be displayed on the screen, it is simple to compile game results and, moreover, game results can be displayed in such a manner that they encourage the ambition and competitiveness of the player.

The present invention is also an electronic game device comprising: clock function means for realizing a clock function and time period specifying means for specifying a time period on the basis of this clock function; wherein the calculating means newly stores game results in the specified time period.

A further aspect of the present invention is an electronic game device, wherein input of the password is carried out by means of attribute buttons relating to the game implementing means. These attribute buttons may be a plurality of view change buttons, for example.

Yet a further aspect of the present invention comprises; characteristics value storing means for storing characteristics values relating to the output device for each of the identification symbols; reading means for reading out characteristics values corresponding to an identification symbol input by a player from the characteristics value storing means; and setting means for setting the characteristics of the output device on the basis of the characteristics values thus read out.

Yet a further aspect of the present invention is a machine-readable recording medium to which program data are written for executing: time period specifying process for specifying a time period by means of clock function means; game result storing process for storing game results achieved in this time period; identifying process for identifying a game player; and process for displaying game results for the identified game player on a screen.

By recording medium, moreover, is meant something on which information (mainly digital data, programs) is recorded by some kind of physical means or other, being such as can have the requisite function performed by a processing device such as a computer or dedicated processor. In other words, this need only be something that can download programs into a computer by some means or other and cause the requisite function to be performed. Included in such media are, for example, flexible disks, hard disks, magnetic tape, photomagnetic disks, CD-ROMs, DVDS, ROM cartridges, RAM memory cartridges equipped with battery back-up, flash memory cartridges, and non-volatile RAM cartridges.

These shall extend to cases where data transfers are received from a host computer via wire or wireless communications lines (public lines, dedicated data lines, satellite circuits, etc.). The so-called Internet is also to be included in the recording media spoken of here.

DESCRIPTION OF THE PREFERRED EMBODIMENTS

Figure 1:
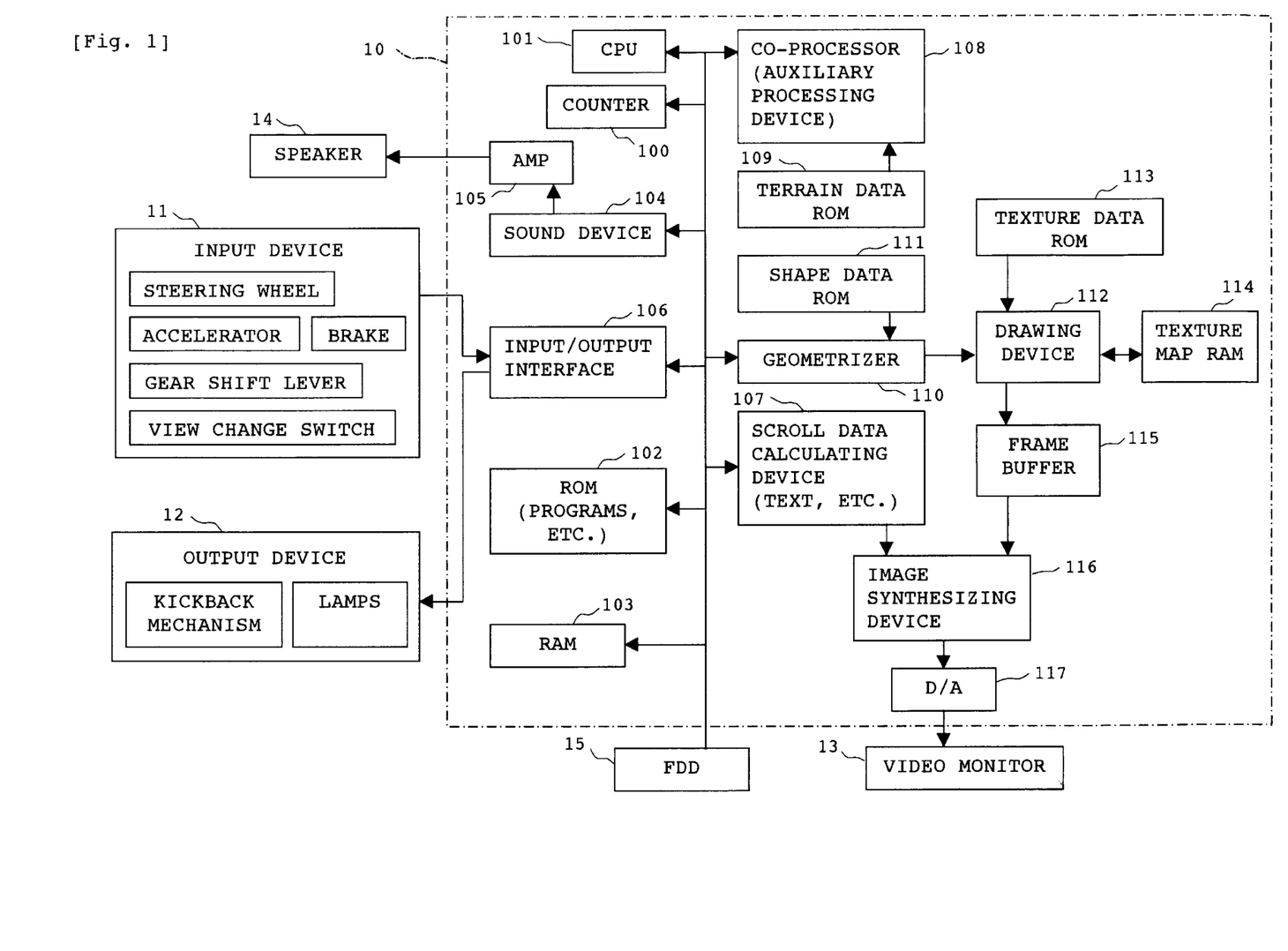
FIG. 1 is a hardware block diagram of an electronic game device according to the present invention.

Firstly, the composition of a game device (electronic game device) for implementing the present invention will be described with reference to the drawings. FIG. 1 is a hardware and functional block diagram of a game device. The game device shown in FIG. 1 is a device for implementing a car race game.

This device comprises as fundamental elements: a game processing board 10, an input device 11, an output device 12, a video monitor 13, a speaker 14, and an FD drive 15. The input device 11 comprises a steering wheel, accelerator, brake, gear shift lever, view change switch, and the like. The output device 12 comprises a handle kick-back mechanism, a suspension characteristics control mechanism, various display lamps, and the like.

The video monitor 13 displays images of a car race game, and a projector may be used in place of the video monitor. The view change switch is a switch for changing the position of an imaginary camera viewpoint. By operating this switch, the player is able to select, for example, a forward viewpoint looking from the driver's seat, a viewpoint showing an oblique rear view of the car, or the like.

The game processing board 10 comprises: a counter 100, a CPU (central processing unit) 101, a ROM 102 forming a storage medium on which operating programs and data for the game device are stored, a (back-up) RAM 103, a sound device 104, input/output interface 106, scroll data calculating device 107, co-processor (auxiliary calculating device) 108, terrain data ROM 109, geometrizer 110, shape data ROM 111, drawing device 112, texture data ROM 113, texture map RAM 114, frame buffer 115, image synthesizing device 116, and D/A converter 117.

Within this composition, CPU 101 is connected via a bus line to: the counter 100, which counts down from an initial value: the ROM 102, which stores prescribed programs, image processing programs, and the like; the RAM 103, which stores calculation data; the sound device 104; the input/output interface 106; scroll data calculating device 107; co-processor 108 and geometrizer 110.

The RAM 103 functions as a buffer and is used for writing various commands to the geometrizer (display of objects, and the like,) and writing data required when conducting various calculations, including calculation of conversion matrices. The input/output interface 106 is connected to the input device 11 and output device 12, and operating signals and detection signals of various kinds from the input device 11 are written to the CPU 101 as digital quantities.

Moreover, signals generated by the CPU 101, and the like, are supplied to the output device 12. The sound device 104 is connected via a power amplifier 105 to a speaker 14. Thereby, an acoustic signal generated by the sound device 104 is amplified in power and output as sound from the speaker 14.

On the basis of programs in the ROM 102, the CPU 101 reads in operating signals from the input device 11 and terrain data from the terrain data ROM 109, or shape data from the shape data ROM 111 (three-dimensional data for objects, such as cars, competitor's cars, etc, and background, such as the road surface, terrain, sky, spectators, various structures, and the like), and conducts calculations for special effects processing, including determining contact between the car and the terrain, determining collision with other cars, calculating the behavior of four-wheel suspension, calculating the behavior of the car (simulation), processing for generating smoke, processing for generating and controlling diffused light, and the like.

Calculation of the behavior of the car simulates the movement of a car in a virtual three-dimensional space (game space), using the operating signals given by the player via the input device 11. In order to implement this, once the co-ordinate values for the polygons constituting the car in the virtual three-dimensional space have been determined, a conversion matrix for converting these co-ordinate values to a two-dimensional co-ordinate system is indicated to the geometrizer 110, along with shape data (polygon data). The co-processor 108 is connected to the terrain data ROM 109, and previously determined terrain data is transferred to the co-processor 108 and the CPU 101.

The co-processor 108 assumes the operation of floating points for determining contact between the terrain and the car or calculating the behaviour of the car. Consequently, the computational load on the CPU is reduced.

The geometrizer 110 is connected to the shape data ROM 111 and the drawing device 112. Shape data consisting of a plurality of polygons (three-dimensional data for cars, terrain, background, etc. consisting of three or more points) is previously stored in the shape data ROM 111, as described above. This shape data is transferred to the geometrizer 110. The geometrizer 110 carries out view conversion of the specified shape data, using a conversion matrix indicated by the CPU 101, thereby yielding shape data which has been converted from the co-ordinates system of the three-dimensional virtual space to a viewpoint co-ordinates system.

The drawing device 112 attaches texture to the converted shape data in the viewpoint co-ordinates system, and outputs the resulting data to a frame buffer 115. in order to carry out this texture attachment process (mapping), the drawing device 112 is connected to the texture data ROM 113 and texture map RAM 114, and it is also connected to the frame buffer 115. Polygon data comprises a group of co-ordinate data for relative or absolute co-ordinates for each vertex of a polygon consisting of a set of three or more vertices. The aforementioned terrain data ROM 109 stores performance data that is set in relatively coarse terms sufficient for carrying out prescribed judgement processes (for example, determining collision, or the like). The shape data ROM 111, on the other hand, stores performance data that is set in more precise terms, relating to the shapes constituting images of the car, background, and the like.

The scroll data calculating device 107 calculates scroll screen data (stored in ROM 102), such as text, and the like. The calculating device 107 and frame buffer 115 are connected via an image synthesizing device 116 and a D/A converter 117 to a video monitor 13. Thereby, polygon screens (simulation results) for the car, terrain (background), and the like, stored temporarily in the frame buffer 115, and scroll screens of text information, such as speed, lap time, and the like, are synthesized according to a designated priority, and the final image data is generated for each frame and at a uniform timing. This screen data is converted to an analogue signal by the D/A converter 117 and supplied to a video monitor 13, where it is displayed in real time as a game screen.

Figure 2:
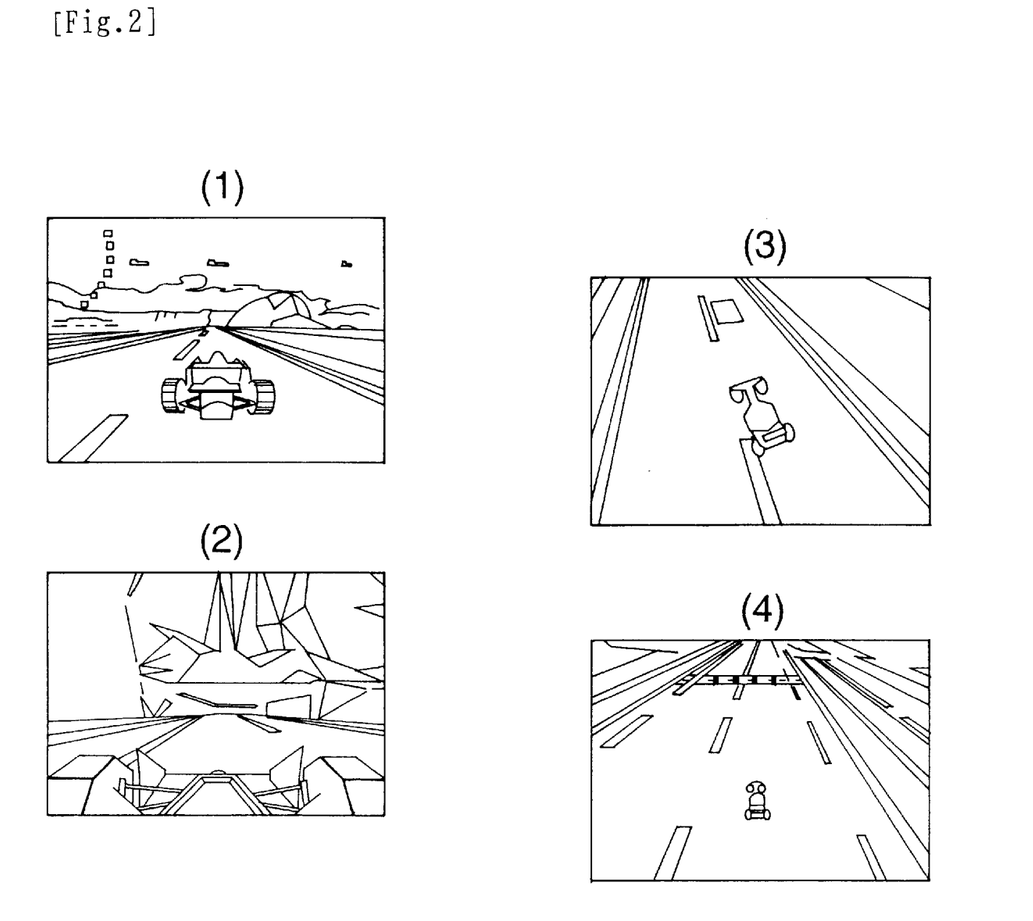
FIG. 2 shows screens wherein the viewpoint is changed by means of a view change switch: (1) is a screen wherein the viewpoint is located obliquely behind the car; (2) is a screen from the viewpoint of the driver; (3) is a screen wherein the viewpoint is located low in the sky above the car; and (4) is a screen wherein the viewpoint is located high in the sky above the car.

FIG. 2 shows game screens displayed on the video monitor 13. FIG. 2(1) shows a state where the viewpoint is located close to the rear end of a car travelling along a course and a video image based on this viewpoint is displayed. FIG. 2(2) is an image viewed from the driver's viewpoint. FIG. 2(3) is an image of the car viewed from the upper side. FIG. 2(4) is an image of the car viewed from even further high point.

The racing car depicted here is operated by the player. In reality, there also exist competitors' cars in addition to this car, but for the sake of convenience, these have not been illustrated. The competitors' cars are operated either by other players who are opponents of the specified player, or by a control device in the game device. Game points are scored each time the car operated by the player catches up with a competitor's car, for example, or each time it passes a prescribed check point on the course. These game points are recorded in a prescribed storage region of the RAM 103. The game device also comprises an internal clock. The internal clock supplies the actual time or a reference time to the CPU 101. The CPU is able to set a prescribed time or time period in the prescribed region of the RAM on the basis of the internal clock data. FIGS. 2(1) through 2(4) are changed by means of the view change switch.

FIG. 3 is a functional block diagram chiefly constituting the game processing board 10. 30 represents means whereby the CPU implements a game on the basis of various programs and data. 32 represents means for inputting identification symbols (personal identification information, such as a name, password, IC card, or the like) to storage means 36 and game result calculating and judging means 34. 34 represents means for calculating the result for the game a implemented by the game implementing means and judging a ranking for the game result. 35 is an internal clock which supplies time information to the game result calculating and specifying means.

36 represents storage means for storing various kinds of data, such as game results, results rankings, operational characteristics values for the output device, and designated time information. 38 represents display selecting means for determining whether to cause display means 40 to display in ranking mode or in tournament mode, depending on a signal from a dip switch 42. The details of each mode are described hereinafter. The person managing the game device selects either of the modes using the dip switch. As shown by the dash and dotted lines, the dip switch may also be used to select whether the method of storage used in the storage means 36 is set to the ranking mode or the tournament mode. In this case, it is possible for the storage means to dispense with storing data required for modes other than the selected mode. If the dip switch 42 functions in this way, then the display selecting means 38 is omitted and the data in the storage means is transferred directly to the display means 40.

Next, a first mode of operation of this game device is described. The person managing this game device is able to select whether the device operates in ranking mode or in tournament mode. This selection is made by setting a flag in a prescribed region of the RAM by means of an input device, such as the dip device described above, The CPU checks the flag in the prescribed storage region of the RAM and controls the game device in accordance with a program for implementing either of the modes. This program is supplied from the ROM 102.

The ranking mode is as follows. The game results can be stored for a prescribed number of games (for example, 20 games). If the player has achieved a game result that exceeds the worst game result among the game results currently stored, then the player's game result is stored and the worst game result is cleared. In other words, the ranking of the game results is updated each time a race game is played, according to the level of the game result. This is the ranking mode.

Next, the tournament mode is as follows. The person managing the game device sets a unit time period (day, week, month) in the RAM of the game device, using the built-in clock function of the game device. The game results of the players achieving the highest scores are then stored in the RAM for each interval of this unit time period.

If the unit time period is a day, then the stored data will be as follows, for example:

| May 1st | (The best player is) | OOO-XX: ooo points |
|---------|----------------------|---------------------|
| May 2nd |                      | OOO-XX: ooo points |
|         | ...                  |                     |
|         | ...                  |                     |
|         | ...                  |                     |
| June 21st |                    | OOO-XX: ooo points |

"OOO" represents letters, which may be the same or different from each other, input by the game player, and "XX" is a prescribed numerical value. "OOO-XX" corresponds to the "name" described above. "XX" is, for example, month data or day data from the birthday of the game player.

Briefly stated, the tournament mode is a mode based on competition between game results (for example, the highest score) within each unit time period. In the tournament mode, the highest number of data entries that can be stored is, for example, 52, as stated previously. Therefore, when 52 days have elapsed after the start of the tournament time period, that particular tournament ends. If the tournament is restarted, the person managing the game device clears the to name entry processing (410). In the name entry processing, the player enters a combination of three letters and two numbers (game player identification symbol), for instance, as described previously, using the input device (steering wheel, accelerator, etc.) under the guidance of the game screen.

When the input has been completed, the CPU stores the identification symbol and game result at the corresponding address of a prescribed region of the RAM. Thereupon, a tournament display is implemented (411). In the aforementioned judgement step 408, if the game result is not the first ranking result value within the unit time period, then the game ends without progressing through the subsequent processing. Furthermore, when the device is not in the tournament mode, it operates in the ranking mode, and therefore, if the game result is determined to be within the greatest twenty results, for example (412), the device transfers to name entry processing (414). Thereupon, a screen display is made in the ranking mode. If the result is below the twentieth ranked result, then the operation of the game device ends without proceeding to the name entry processing.

Figure 5:
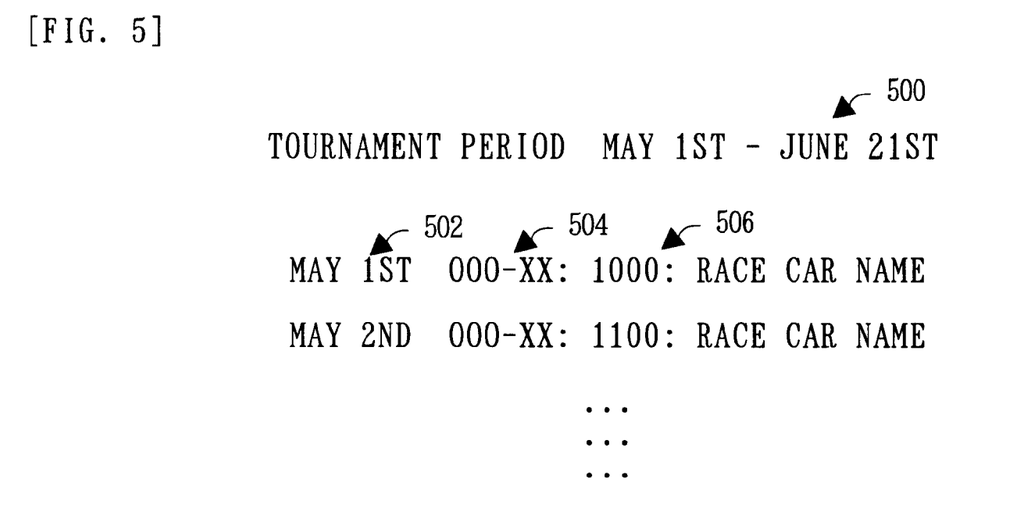
FIG. 5 is one example of a game results display screen.
Figure 6:
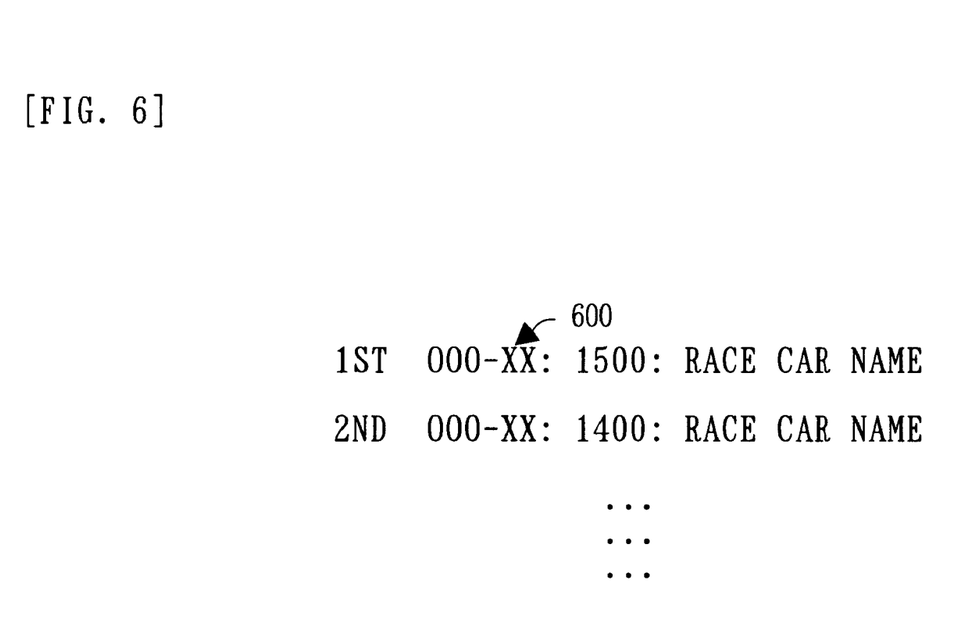
FIG. 6 is a further example of a game results display screen.

Both in the tournament mode and in the ranking mode, the display device shows game results for each player identification symbol. FIG. 5 is a display screen in tournament mode and FIG. 6 is a display screen in ranking mode.

In tournament mode, the time period (500) of the tournament is displayed in the upper portion of the screen. The name entry symbol (504) and the game score (506) for that symbol are also displayed for each date (502) which is the unit time period. As stated above, this game score is the highest score in the unit time period. The number of game scores stored for each unit time period is not limited to one, and several scores may be stored. The maximum value of designated time periods in the tournament mode is equal to the product of the unit time period and the maximum storage number. In the aforementioned example, this is [the unit time period (day)]*[maximum storage number (52)], in other words, a period of 52 days. Since the number of game scores displayed at any one time is limited, data for each of the highest scores, for example, 52 highest scores, as described above, is displayed on the screen in order by scrolling.

This screen is displayed during the advertising period. A player can start a race game by inserting a coin and pressing the start button during this period.

The person managing the game device is able to identify the person achieving the highest score within each of the unit time periods in the tournament time period, simply by looking as this display screen.

FIG. 6, on the other hand, is a display screen in ranking mode. In this mode, data for a person achieving a game result of a prescribed ranking or above is stored in place of the data for the lowest ranked person. The tournament time period and unit time period are not displayed on the screen. The game results of players identified by text of three letters are displayed in order from the highest scoring player (600). This data is stored in a prescribed region of the memory, unless the memory of the game device is cleared.

In the ranking mode, it is not straightforward to compile the highest scoring players within the tournament time period simply from the ranking mode display screen. This requires the assistance of manual operation by the game device manager. For example, recording the changes in the game rankings each day is required.

Next, the second mode of operation of the game device is described. This mode differs from the foregoing mode in the following respects. The player is able to specify a password. No time periods are specified. Game results for the same player within the tournament time period are added together in a cumulative fashion.

Figure 7:
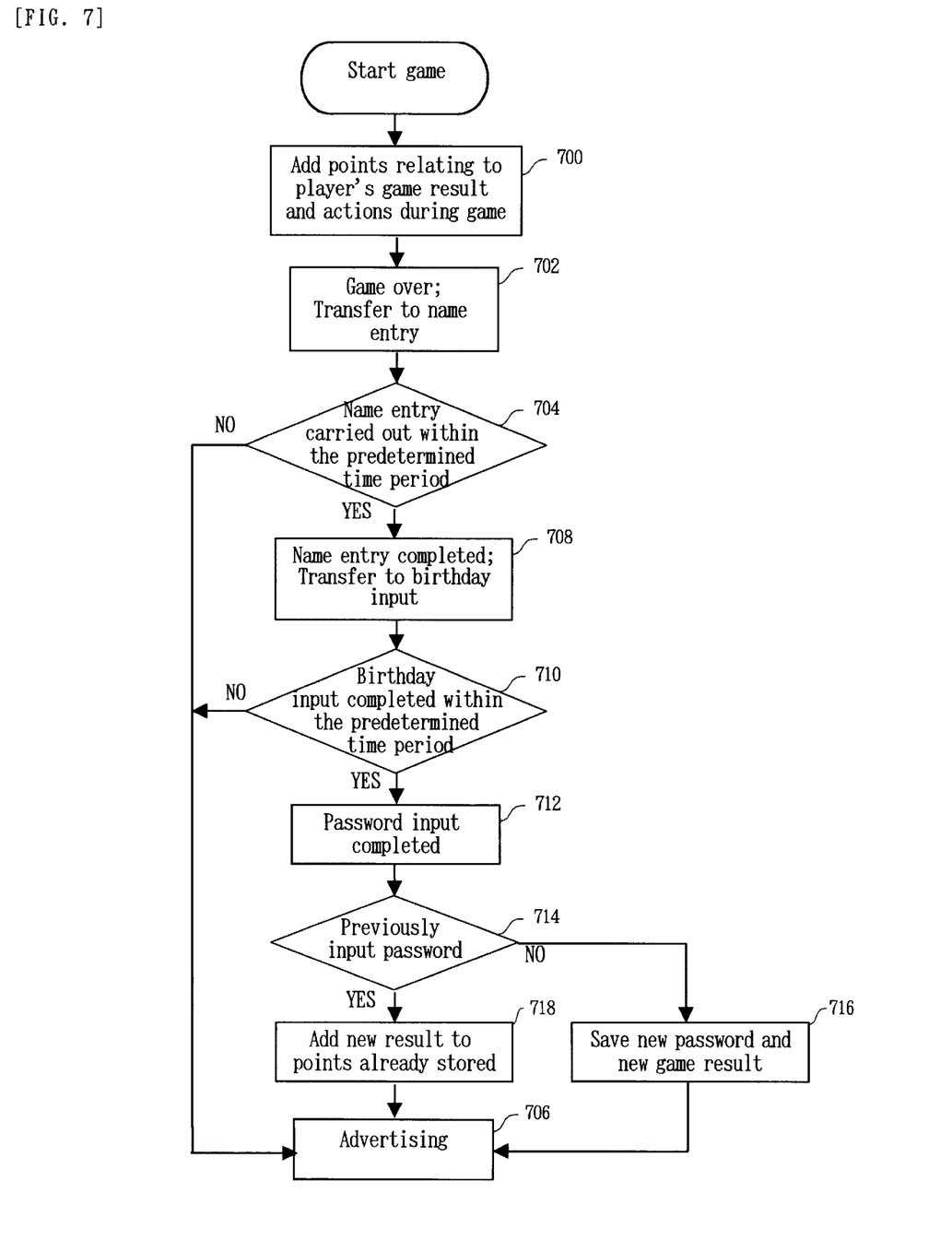
FIG. 7 is a further operational flowchart for an electronic game device according to the present invention.

FIG. 7 is a flowchart illustrating this operation. Firstly, similarly to the first mode of operation described above, the game manager selects tournament mode using a dip switch inside the game device. Thereupon, a player plays the game. The game result is stored in a prescribed region of the RAM (700).

When the game has been finished, a game completion screen is output, and the device transfers to name entry processing (702). If the inputs for name entry are not carried out within a prescribed time period (704), then this processing is terminated compulsorily and an advertising screen is displayed on the monitor (706). Advertising refers to a screen displayed on the monitor during standby periods between the times that the game is played. In this embodiment, a list of the players' game results is displayed.

Figure 8:
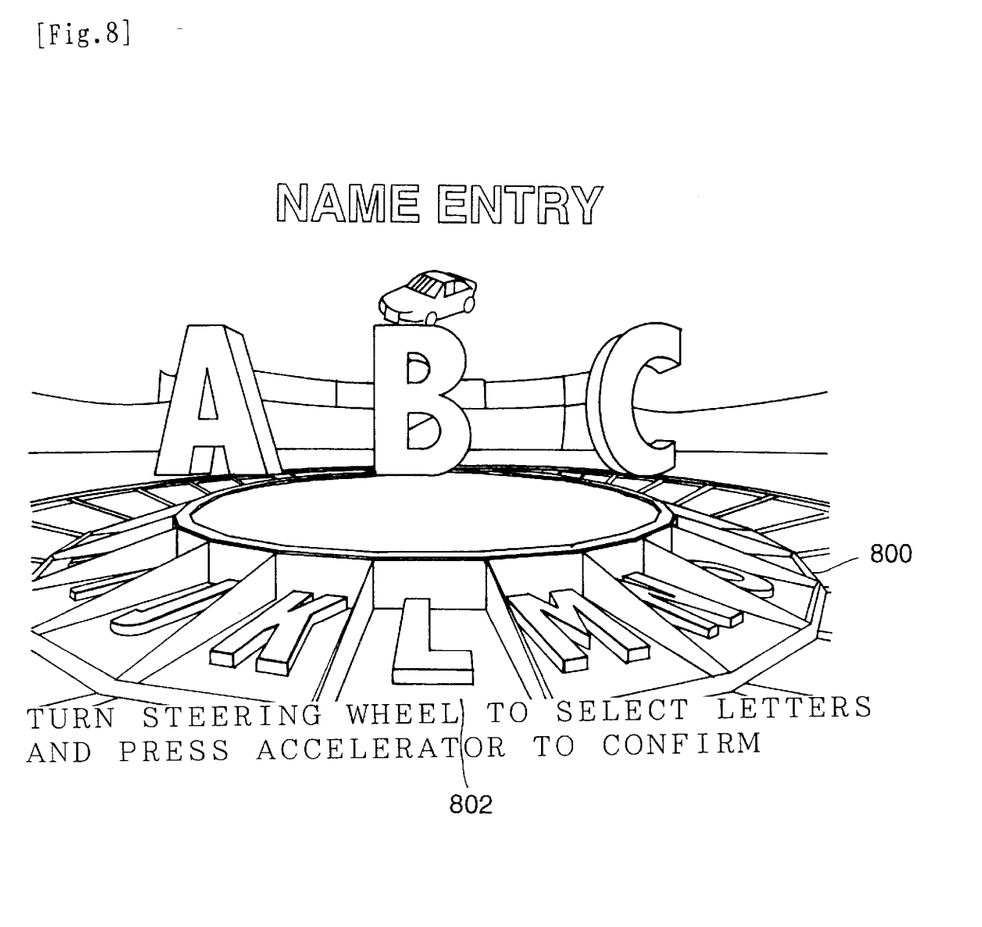
FIG. 8 is a guide screen for name entry.

In the name entry time period, three text letters (ID numbers) are input. FIG. 8 is a screen showing an input example of three text letters. When the steering wheel is rotated, the table (800) displayed in the center of the screen rotates in the corresponding direction. The letter (802) positioned in front of the player is selected by pressing on the accelerator. By repeating this operation three times, an individual ID consisting of three letters is determined (FIG. 7: 708).

Figure 9:
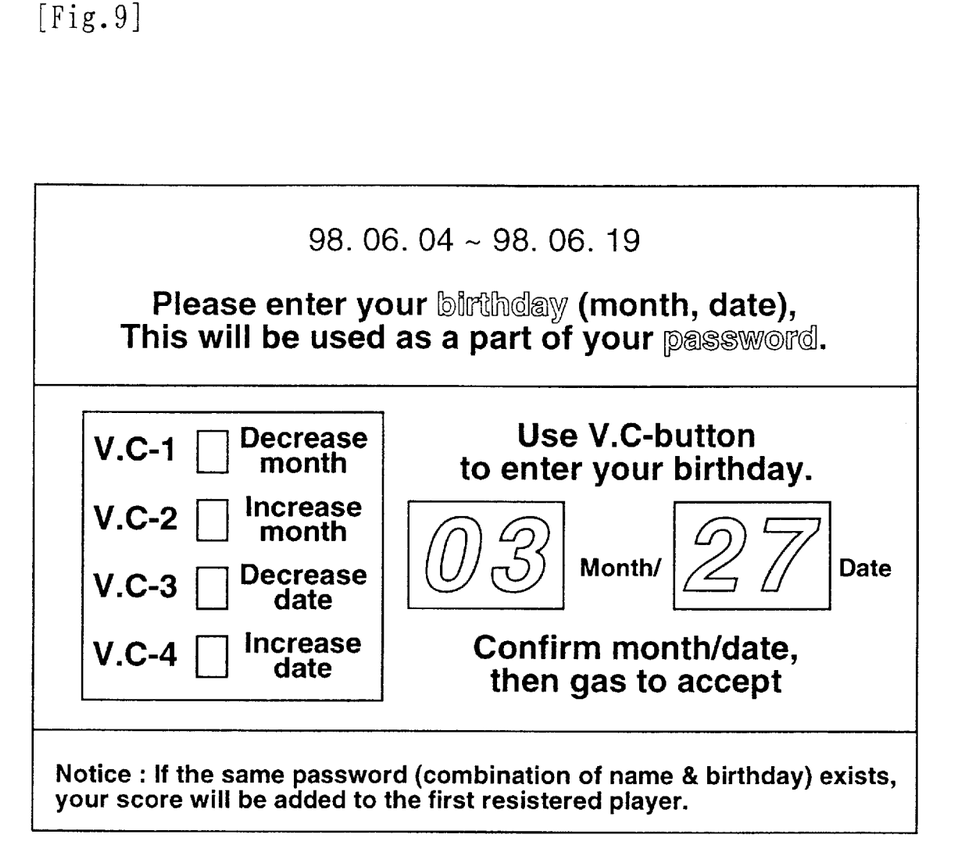
FIG. 9 is a further example of a game results display screen.

Thereupon, in addition to the aforementioned ID number, a password is input as individual identification information, This corresponds to a password wherein four numerical digits are appended to the ID number. An example of this input is shown in FIG. 9. FIG. 9 is a password input screen. The V.C-1 through 4 items on the left-hand side of the screen correspond to view change buttons. The image in FIG. 2(1) corresponds to an image from the viewpoint selected by V.C-1, and thereafter in sequence, the image in FIG. 2(4) corresponds to an image from the viewpoint selected by V.C-4. In this way, in this game device, it is possible to input individual identification information (password) using attribute switches, such as view change switches, and the like. Therefore, it is not necessary to provide new, superfluous switches, and the input operation is straightforward.

It may be recommended that the birthday of the player is used as the four numerical digits. V.C-1 is a switch for decreasing the month number, V.C-2 is a switch for increasing the month, V.C-3 is a switch for decreasing the day number, and V.C-4 is a switch for increasing the day number. The input results are displayed in the center of the screen in the form "03 Month 27 Date," for example. Since these four numerical digits may correspond to a password, they are not displayed on the advertising screen. Since the birthday is distinctive data for the player, there is no difficulty in entering this data. It is also possible to use a combination of attribute button numbers and colors, for example, in place of the player's birthday. Different colors can be assigned to each of the view change switches.

If the birthday (password) is not entered within the prescribed time period (710), then the device returns compulsorily to the advertising screen (706). In this case, the ID in the previously input name entry becomes invalid.

When input of the password has been completed (712), it is determined whether or not that combination of ID number and password (individual identification information) exists in the RAM (714). If this judgement produces a negative result, then the individual identification information and the game result on the current screen are registered in a prescribed region of the RAM as a new player registration (716).

If this judgement produces a positive result, then the device transfers to game result addition permission judgement processing (718). In this processing step, it is possible to cause the device to determine that addition of game results is not permitted, if specific conditions are not satisfied, for example, if a significant period of time has elapsed since the player played the game previously, or if the number of games played by the player does not satisfy a prescribed number. In short, this relates to cases where the frequency with which the player plays the game is below a prescribed level. In order to enable this judgement to be made, prescribed data, such as the times at which games are played and the number of times the game is played can be stored in means 36 (RAM 103) in FIG. 3, for each item of individual identification information. By setting all of the parameters for carrying out this judgement processing to zero, it is also possible to set the device such that this judgement processing is not carried out. Moreover, it is also possible to carry out processing with respect to the game results, such as, for instance, applying a handicap according to the frequency of game play.

If the judgement (714) produces a positive result, then the CPU 101 (game calculating means 34) reads out the game results relating to the corresponding individual identification information in the RAM, adds the current game result thereto, and updates the data stored in the memory device with the resulting added data.

Figure 10:
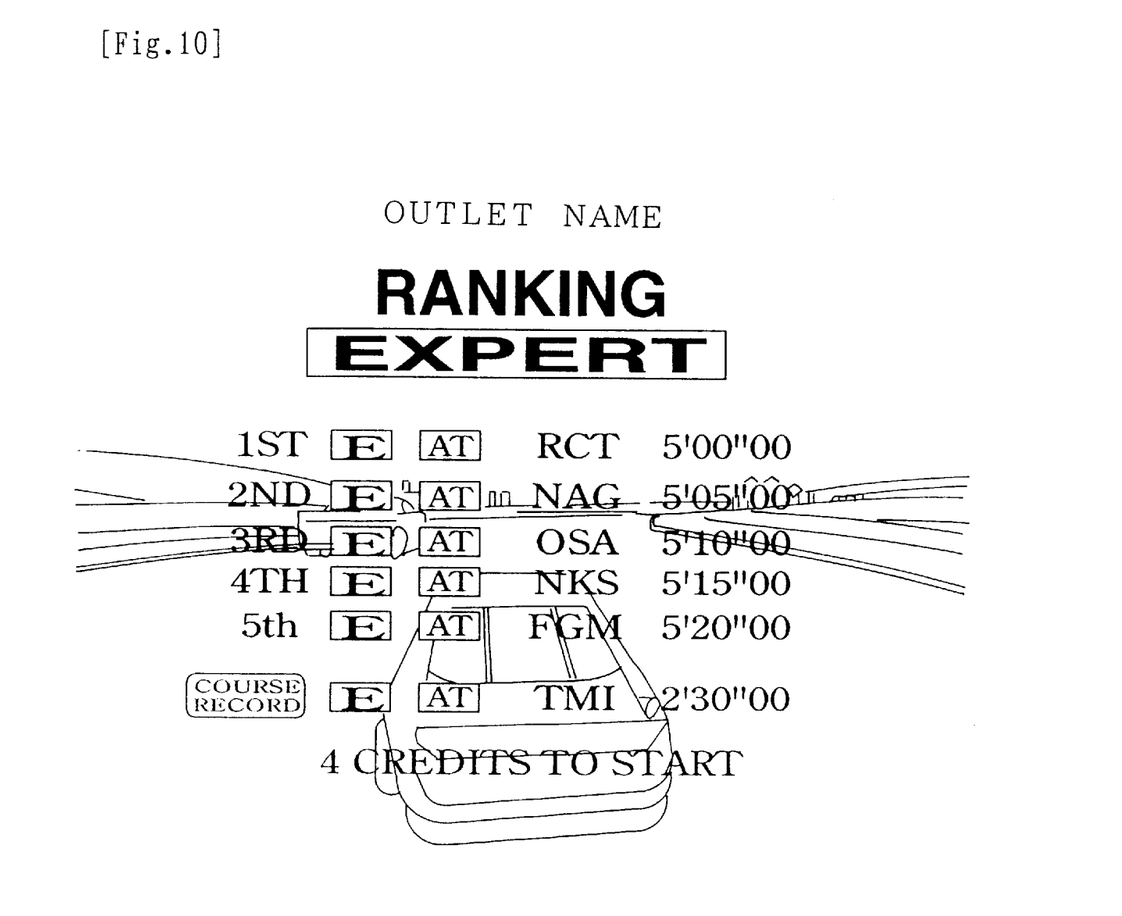
FIG. 10 is yet a further example of same.
Figure 11:
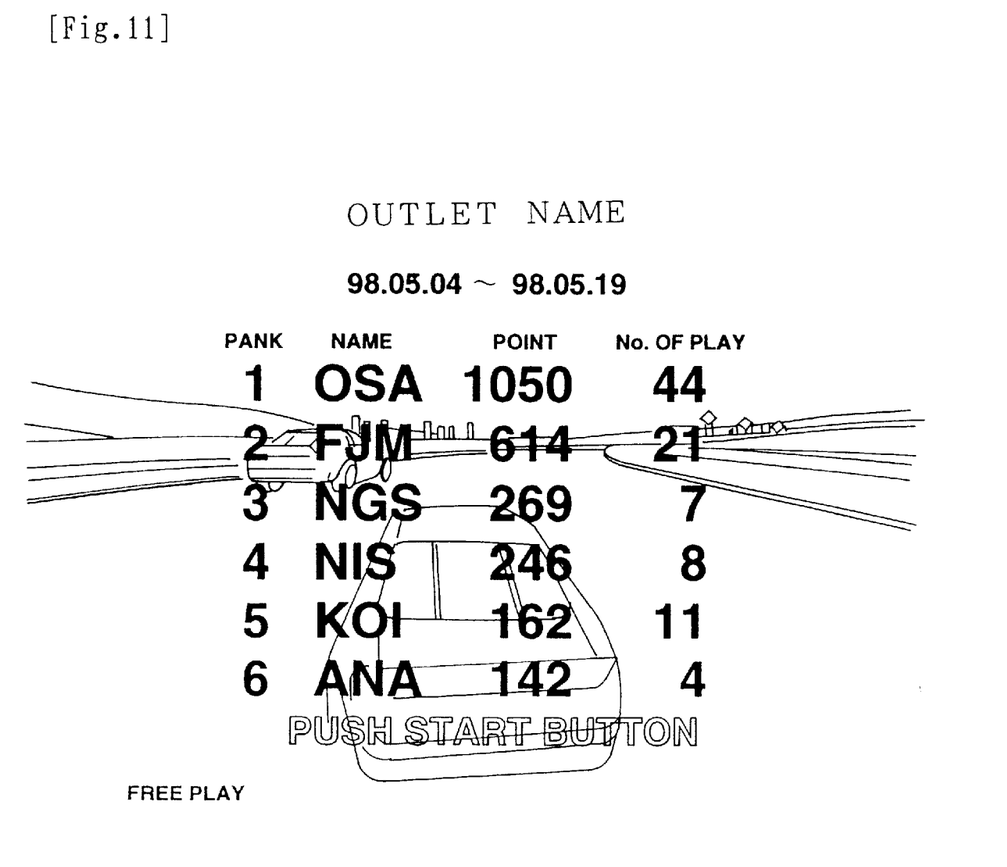
FIG. 11 is yet a further example of same.

As shown in FIG. 10, an the advertising screen, a total lap time (game result) is shown for each ID. In this case, the smaller the total of the lap times, the higher the ranking of the game result in the display. A low total for the lap times is reflected in a high game result value. FIG. 11 shows a game screen where the results are displayed in order from the greatest game result, in other words, by ranking, instead of by lap time.

Game result calculating and judging means 34 determines on the basis of the internal clock data whether or not the date and time that the game was played is within a designated time period, and if it is outside this designated time period, then the device can be operated such that game result addition processing is not carried out and the screen is displayed in the aforementioned ranking mode. It is also possible for game results to be added up without specifying a time period. The mode by which game results are accumulated is not especially limited to simply adding up the game results, but may also involve applying handicaps, and the like.

The player is able to set the operational characteristics of the output device (operational characteristics of the steering wheel kick-back mechanism, operational characteristics of the suspension device), and the like, to desired values. In this case, the CPU 101 can be made to record these characteristics in storage means 36 in combination with the aforementioned identification symbol. When a player inputs his or her identification symbol, the aforementioned means 34 reads out characteristics data from storage means 36, and this data is set in the output device. The player is not required to set the characteristics of the output device again every time he or she plays. The method for supplying identification symbols to the game device is not limited to that illustrated in FIGS. 8 and 9 described above, and it may also be based on IC cards.

According to this operational mode, the game player and manager of the game device are able to ascertain the total game results for each player at a glance, simply by looking at the game results displayed on the game screen. This not only simplifies the compilation of game results, but it also means that, rather than having a monotonous results display mode, an appealing game results display can be achieved, which stimulates the ambition and competitiveness of the player, and the like. This also applies similarly in the case of the first operational mode described previously.

This game device can be used in the following ways. Data relating to the place in which the game device is installed (outlet data) can be recorded in the storage means of the game device. A contest can be held between different game devices by means of a communications circuit. Consequently, race competitions between outlets within a designated time period become possible. Moreover, since data can be shared between plurality or game machines, it is possible to display the overall game results on the display device in each game machine.

The information storage medium (ROM) refers to HD, FD, LD, cassette ROMs, and the like, as well as circuits, such as the Internet and PC communications, and terminal or server internal memories, or the like.

The electronic game device relating the present invention is not used only for car racing, but may also be applied widely to various racing games, such as motorbike racing, and other games wherein players compete with each other in terms of game scores.

As discussed previously, according to the present invention, it is possible to provide an electronic game device having an improved game results display mode which is not monotonous, and furthermore, it is possible to provide an electronic game device having an excellent game results compiling function. Moreover, it is also possible to provide an electronic game device wherein characteristics of the game device suited to each individual player do not have to be set each time the game is played.

What is claimed is:

1. An electronic game device comprising:
   clock function means for realizing a clock function;
   time period specifying means for specifying a time period consisting of a plurality of predetermined unit time periods by means of said clock function means;
   game result storing means for storing game results achieved in each unit time period;
   identifying means for identifying game player; and
   means for displaying game results achieved in each unit time period of the specified time period for the identified game player who achieves a specified game result on a screen.

2. The electronic game device according to claim 1, wherein said game results storing means is a memory storing the greatest game results in said specified time period.

3. The electronic game device according to claim 1, wherein said game results storing means is a memory storing cumulative game results in said specified time periods.

4. The electronic game device according to claim 1, wherein said identifying means comprises means for inputting an identification symbol selected by the game player.

5. The electronic game device according to claim 4, wherein said identification symbol contains a password.

6. The electronic game device according to claim 4, wherein said identifying means is means for inputting data relating to the birthday of the game player as said identification symbol.

7. The electronic game device according to claim 4, comprising:
   storing means for storing said identification symbols;
   judging means for judging agreement with an input identification symbol; and
   means for (i) reading out a game result stored in said storing means, (ii) adding the game result read out from the storing means, and (iii) storing this sum value in said game result storing means when this judgement produces a positive result.

8. The electronic game device according to claim 1, wherein said game result is stored in cases where the game playing environment, such as the times at which the game has been played and the number of times that the game has been played, satisfies or exceeds prescribed values.

9. The electronic game device according to claim 1, wherein data exchange with another game device is conducted by means of communications circuits, and wherein the full record for the plurality of game machines are displayed.

10. A machine-readable recording medium to which program data are written for executing:
    time period specifying process for specifying a time period consisting of a plurality of predetermined unit time periods by means of clock function means;
    game result storing process for storing game results achieved in each unit time period;
    identifying process for identifying game player; and
    process for displaying game results achieved in each unit time period of the specified time period for the identified game player who achieves a specified game result on a screen.

* * * * *

UNITED STATES PATENT AND TRADEMARK OFFICE
CERTIFICATE OF CORRECTION

PATENT NO.    : 6,149,519
DATED         : November 21, 2000
INVENTOR(S)   : Makoto Osaki et al.

It is certified that error appears in the above-identified patent and that said Letters Patent is hereby corrected as shown below:

<u>Column 11,</u>
Line 45, "periods" should read -- period --.

Signed and Sealed this

Seventeenth Day of June, 2003

JAMES E. ROGAN
*Director of the United States Patent and Trademark Office*